Sept. 17, 1968  W. M. ARMSTRONG ET AL  3,401,620
VENTILATOR FOR VEHICLE ROOF
Filed March 6, 1967  2 Sheets-Sheet 1
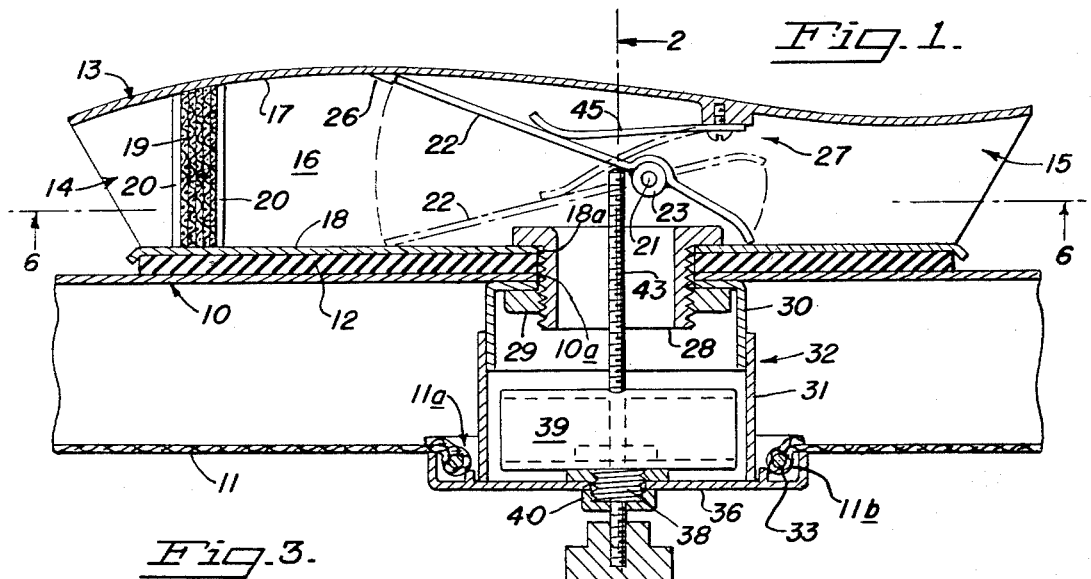
INVENTORS
WILLIAM M. ARMSTRONG
MERVIN J. HOOEY
BY J.E. Trabucco
ATTORNEY

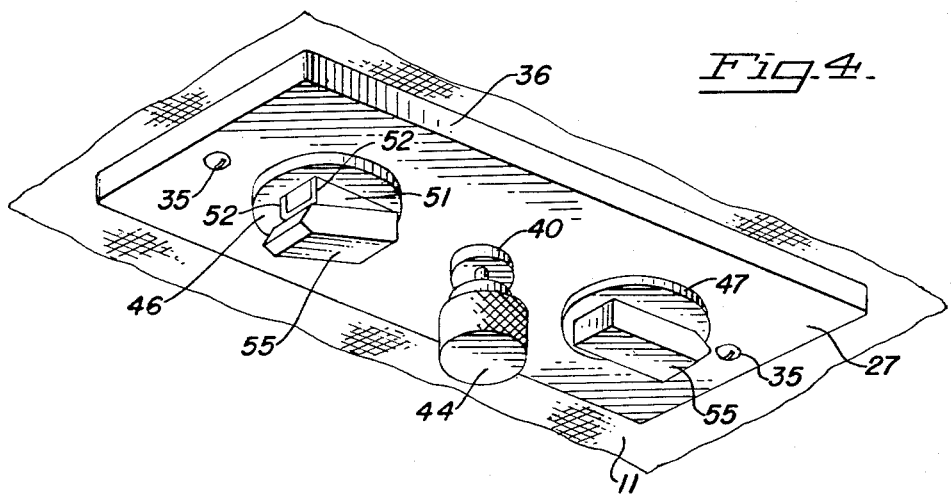
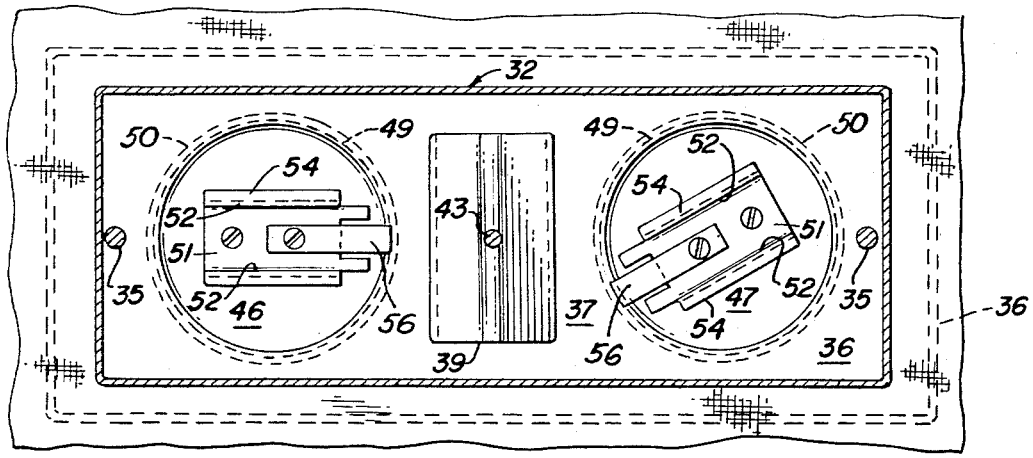
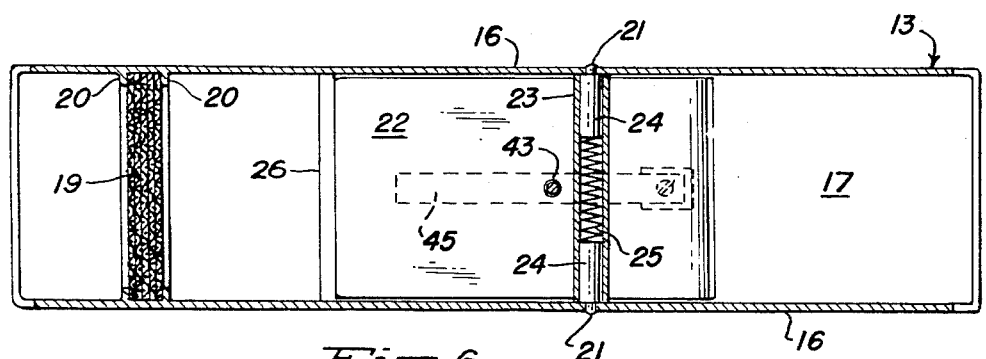

United States Patent Office 3,401,620
Patented Sept. 17, 1968

3,401,620
VENTILATOR FOR VEHICLE ROOF
William M. Armstrong, 25 Patrol Court, Woodside, Calif. 94062, and Mervin J. Hooey, 1250 Phelps St., San Francisco, Calif. 94124
Filed Mar. 6, 1967, Ser. No. 620,829
6 Claims. (Cl. 98—2)

ABSTRACT OF THE DISCLOSURE

A roof ventilator, including an adjustable damper, mounted on the top of a vehicle over an aperture to control the flow of air into or out of the vehicle compartment. The damper is controlled from within the body.

---

This invention relates to the ventilation of vehicle bodies and more particularly to a novel roof ventilator mounted on the top of a vehicle body having means to control the flow of air into or out of the passenger compartment of the vehicle when such vehicle travels forwardly.

An object of our invention is the provision of a vehicle ventilator of the type mounted on the top of a vehicle body having a ventilating opening for admitting fresh air into the interior of the body and for exhausting stale air therefrom, the ventilator having damper means controlled from within the body which in one position directs fresh air through the ventilating opening into the vehicle body and which in another position effects the exhausting of stale air from the body.

Another object of our invention is to provide an improved vehicle ventilator of the kind characterized which embodies manually operated means to control the flow of air either into or from the vehicle body, and also means to selectively control such air flow to and from different areas within the vehicle body.

Other and further objects of this invention will be indicated in the appended claims or will be obvious to one skilled in the art upon an understanding of the present disclosure. For the purpose of this application I have elected to show herein certain forms and details of a vehicle ventilator which is representative of our invention; it is to be understood, however, that the embodiment of our invention herein shown and described is for purposes of illustration only and that therefore it is not to be regarded as exhaustive of the variations of the invention in the art.

In the accompanying drawing:

FIG. 1 is a longitudinal vertical sectional view of the top portion of a vehicle body and the ventilator mounted thereon;

FIG. 2 is a vertical sectional view taken on the line 2—2 of FIG. 1;

FIG. 3 is a front view of the ventilator housing;

FIG. 4 is a perspective view of the air control members located in the vehicle body within reach of the passengers;

FIG. 5 is a sectional view taken on the line 5—5 of FIG. 2;

FIG. 6 is a sectional view taken on the line 6—6 of FIG. 1; and

FIG. 7 is a sectional view taken on the line 7—7 of FIG. 2.

Referring to the drawings the numeral 10 designates the sheet metal top or roof and 11 the underlying fabric or plastic lining of a vehicle body which are formed, respectively, with vertically aligned ventilating openings 10a and 11a for the passage of air into and from the interior of the vehicle body.

Mounted on a resilient apertured gasket 12 on the top 10 of the vehicle body is an elongated tubular ventilator housing 13 which extends longitudinally with respect to such top and is formed with an air intake opening 14 at its forward end and an air outlet opening 15 at its rear end. The ventilator housing 13 is preferably of general rectangular shape in cross-section, and it comprises opposed longitudinal sides 16, 16, a top side 17 and a bottom side 18 which is provided wtih an air inlet and outlet opening 18a which is vertically aligned with the ventilating opening 10a in the body top 10. The forward end portion of the housing 13 is provided with a wire mesh screen 19 to prevent insects from entering the vehicle body through the ventilator. The screen 19 is retained in a substantially vertical position by inwardly projecting pairs to vertical protrusions 20 on the sides 16, 16 of the housing.

Mounted within the ventilator housing for adjustment about horizontally aligned pivot pins 21 is a ventilator damper or vane 22 to control the flow of air into and from the vehicle body. The ventilator damper 22 overlies the opening in the bottom of the housing and its width is such that its lateral edges are in fairly close proximtiy to the opposed sides 16, 16 of the housing. The means to pivotally support the damper may embody various forms, but in the present embodiment it comprises a transversely disposed tube 23 secured to the damper 22 between the forward and rear end thereof and pistons 24 which are urged outwardly in opposite directions by a coiled spring 25 to maintain the pivot pins 21 at ends of such pistons in suitable openings in the opposed sides 16, 16 of the ventilator housing. The damper 22 is preferably in the form of a substantially rectangular plate, the forward end of which is adapted to abut the top side 17 of the ventilator housing at a point substantially forwardly of the ventilating opening 10a in the housing and close to but rearwardly of a transverse air deflector protuberance 26 on the underneath side of the top side. The rear portion of the damper preferably curves downwardly and the end thereof is adapted to engage with the bottom side 18 of the ventilator housing at a point rearwardly of the opening 18a in such bottom side. When the damper is positioned as shown in full lines in FIG. 1 with its forward end abutting the top side 17 of the ventilator housing 13 and its rear end abutting the bottom side 18 of such housing air entering the intake opening 14 is deflected downwardly through the ventilating openings 18a and 10a. When the damper 22 is in the position shown by the broken lines in FIG. 1 with its forward end abutting the bottom side 18 of the ventilator housing 13 the incoming air is excluded from the vehicle body. When so positioned the curved rear end portion of the damper is positioned slightly below the top side 17 of the ventilator housing to provide a narrow passageway as at 27 for the flow of air rearwardly past the curved end portion of the damper to the outlet opening 15 in the housing. The narrow passageway 27 in combination with the curved rear end portion of the damper functions somewhat in the nature of a Venturi tube to accelerate the air flow through the rear end portion of the housing, thereby creating a suction to draw stale air from the vehicle body and effect its discharge through the outlet opening 15 in the housing. When the damper 22 is positioned with its forward end engaging with the bottom side of the ventilator housing the incoming air striking against the then rearwardly inclined damper is deflected upwardly through the narrow passageway 27. It is, of course, to be understood that the air flow through the ventilator housing normally occurs only when the vehicle is traveling at a predetermined speed forwardly.

Extending downwardly through the vertically aligned ventilating openings in the botom side 18 of the housing 13 and the body top 10 is a nipple of tubular fitting 28 which has an outwardly extending flange at its upper end which rests upon the said top. The tubular fitting 28 is provided with external threads for the engagement of a locknut 29 to securely clamp the flat upper side of an enclosure member 30 against the top 10. The depending sides of the enclosure member 30 are preferably arranged in rectangular formation, and the upper side of such enclosure member is provided with a ventilating opening in registry with the opening 10a in the top 10. Slidably fitting around the enclosure member 30 is a telescopically arranged enclosure member 31, the said enclosure members forming a tubular enclosure 32 which may be adjusted as to its vertical dimension in accordance with the relative positions of the top 10 and the underlying lining 11. Since in different types and makes of vehicle bodies there may be a variance in the spacing between the top and the lining, the telescopic arrangement of the enclosure members 30 and 31 makes possible the vertical lengthening or shortening of the enclosure 32 so the ventilator may be adapted for use with most vehicle bodies.

Edge portions of the lining 11 at the four sides of the opening 11a are folded back and secured to the said lining by suitable means such as stitching to provide eyelets 11b to hold a rectangular wire ring 33.

Secured to the end of the enclosure member 30 are vertical internally threaded tubes 34 which are engaged by adjustable screws 35 to securely hold a face plate 36 in a position enclosing the lower side of the enclosure 32. The enclosure 32, the top side of the enclosure member 30 and the face plate 36 enclose an air distributing chamber 37 which communicates with the ventilating opening 10a in the top 10 of the vehicle body.

The face plate 36 which is of substantially rectangular shape is provided centrally with an opening to receive an internally and externally threaded flanged sleeve 38. The upper flanged end of the sleeve 38 is held in a clamped position against a transversely arranged air divider 39 by a cap nut 40 which engages with the external threads on the flanged sleeve 38. The air divider 39 is formed with inclined converging sides which extend transversely and are adapted to deflect air flowing downwardly into the air distributing chamber in opposite directions toward circular ventilating openings 41 and 42 in the face plate 36. The sleeve 38 is provided with a vertical threaded opening for the operative engagement of an elongated damper adjusting screw 43 which extends vertically, such adjusting screw also extending upwardly through the fitting 28 to engage at its upper end with the damper 22 at a point forwardly of the transverse axis about which the damper pivots. The lower end of the adjusting screw 43 is secured to an adjusting knob 44 to provide means located in the vehicle body within reach of the passengers to adjust the screw upwardly and downwardly. Mounted on the top side 17 of the ventilator housing is a spring 45 which engages with an exerts a downward pressure on the forward end portion of the damper 22.

By adjusting the screw 43 upwardly the forward end of the damper 22 may be brought into engagement with the top side 17 of the ventilator housing to direct the incoming air entering through the intake opening 14 downwardly and into the air distributing chamber 37 from whence it is admitted to the inside of the vehicle body through either or both of the openings 41 and 42. As the adjusting screw 43 is retracted by turning it in the opposite direction the forward end portion of the damper 22 is actuated by the spring 45 in a downward direction until the forward end of such camper engages with the bottom side 18 of the ventilator housing to prevent the air entering through the intake opening 14 from proceeding downwardly through the ventilating opening 10a into the vehicle body, but rather, such incoming air is directed rearwardly through the narrow passageway 27 and thence through the outlet opening 15 in the housing. When the damper 22 is in the position last mentioned with its forward end engaging with the bottom side 18 of the ventilating housing, the rear end of such damper has been raised to a position wherein air may be drawn from the vehicle body through either or both of the ventilating openings 41 and 42 in the face plate, into the distributing chamber 37 in the enclosure 32 and through the ventilating openings 10a and 18a to be finally discharged through the outlet opening 15 in the ventilating housing.

So as to provide means to control the air flowing into and from the vehicle body, we have mounted circular air control members 46 and 47 in the ventilating openings 41 and 42, respectively, such air control members each having a plate-like lower side provided with a slotted opening 48 for the passage of air into and from the vehicle body. The air control members 46 and 47 each have an outwardly extending circular flange 49 which rests on the face plate 36, and is held in place by a circular flange 50 which is formed on the bottom of the enclosure member 31. The air control members 46 and 47 are mounted for rotatable adjustment. Adjustably mounted in the slotted opening 48 of each of the air control members 46 and 47 is an air control element 51 which is provided with opposed wedge-shaped sides 52 forming an air channel 53. The opposed wedge-shaped sides 52 have outwardly disposed flanges 54 which are adapted to overlay and engaged with the plate-like sides of the air control members 46 and 47 to prevent the downward displacement of the air control elements 51 beyond certain adjusted positions. Secured to and depending from each air control element 51 is a knob 55 for adjusting such element vertically and for rotating its associated air control member 46 or 47 to position the air channel 53 so the air entering the vehicle may be directed as desired. A tension spring 56 secured to each air control element 51 extends over and in engagement with the circular flange 49 of an associated air control member. When an air control element 51 is adjusted downwardly to a position wherein the outwardly disposed flanges 54 thereof engage with the plate-like lower side of its associated air control member 46 or 47, the air channel 53 is fully opened and air may then enter the vehicle body from the air distributing chamber 37 through the slotted opening 48, or the stale air in the body may be evacuated therefrom. When an air control element 51 is adjusted upwardly to a position where its lower side is in substantially the same plane as the plate-like lower side of its associated air control member 46 or 47, the opening 48 is closed to prevent air from entering or leaving the vehicle body. The air control elements 51 may be each adjusted to positions wherein its air channel 53 is partially open to suitably control the volume of air entering the vehicle body. The knob 55 of each air control element 51 is adapted to engage with the plate-like lower side of an associated air control member 46 or 47 to prevent the upward displacement of the said element beyond a fully closed position.

What we claim is:

1. A ventilator for a vehicle body having a ventilating opening in the top thereof, the combination comprising:
   (A) an elongated tubular housing mounted longitudinally on the top of such a vehicle body in a position overlying the ventilating opening therein, the said housing having:
      (a) a top, a bottom and lateral sides;
      (b) an air intake opening in the forward end thereof;
      (c) an air outlet opening in the rear end thereof; and
      (d) an air inlet and outlet opening in the bottom thereof in communication with the ventilating opening in the top of the vehicle body.
   (B) a damper mounted in the housing for pivotal adjustment about a substantially horizontal transverse axis, the damper in a first adjusted position being in a forwardly inclined position with the forward end thereof engaging with the top of the housing at a point forwardly of the ventilating opening in the said bottom and the rear end thereof engaging with the said bottom at a point rearwardly of the ventilating opening to direct incoming air through the ventilating opening in the said bottom, the damper in a second adjusted position being in a rearwardly inclined position with the forward end thereof engaging with the bottom of the housing at a point forwardly of the ventilating opening in the bottom and the rear end thereof being positioned in spaced relation below the upper side of the housing to form a narrow channel for the passage of incoming air through the housing, the ventilating opening in the bottom of the housing and the outlet opening being in communication with each other when the damper is in the second adjusted position, whereby air in the vehicle body may be drawn therefrom and exhausted through the outlet opening in the housing; and (C) means to adjust the damper to control the air flow into and from the vehicle body.

2. A ventilator for a vehicle body having a ventilating opening in the top thereof, the combination according to claim 1, wherein the damper is in the form of a substantially rectangular plate supported in the housing for pivotal adjustment about a transverse horizontal axis disposed between the ends of such damper.

3. A ventilator for a vehicle body having a ventilating opening in the top thereof, the combination according to claim 1 wherein the means to control the air flow into and from the vehicle body includes:
(A) an elongated adjustable screw supported from the vehicle body top, the said screw having the upper end thereof engaging with the damper from beneath at a point forwardly of the horizontal axis and the lower end thereof extending into the vehicle body; and
(B) a tensioned spring engaging with the damper from above at a point forwardly of the horizontal axis.

4. A ventilator for a vehicle body having a ventilating opening in the top thereof, the combination according to claim 1 wherein the means to control the air flow into and from the vehicle body includes:
(A) an elongated adjusting screw supported from the vehicle body top and extending through the openings in the body top and the bottom of the housing, the said adjusting screw having the upper end thereof engaging with the damper from beneath at a point forwardly of the horizontal axis and the lower end thereof extending into the vehicle body and having a hand engageable member thereon; and, (B) tensioned spring means engaging with the damper from above at a point forwardly of the horizontal axis.

5. A ventilator for a vehicle body having a ventilating opening in the top thereof, the combination according to claim 1 wherein the means to adjust the damper to control the air flow into and from the vehicle body includes:
(A) an elongated adjusting screw supported from the vehicle body top and extending through the ventilating openings in the body top and the bottom of the housing, the said screw having the upper end thereof engaging with the damper from beneath and at a point forwardly of the horizontal axis and the lower end thereof extending into the vehicle body;
(B) tensioned spring means engaging with the damper from above at a point forwardly of the horizontal axis;
(C) an enclosure supported from the vehicle body top and having an air distributing chamber therein communicating with the ventilating opening in the body top;
(D) a plurality of openings in the enclosure in communication with the interior of the body; and
(E) independently operated air control means associated with the openings in the enclosure to control the directional flow of air into the body from the chamber.

6. A ventilator for a vehicle body having a ventilating opening in the top thereof, the combination according to claim 1 wherein the means to control the air flow into and from the vehicle body includes:
(A) a vertically adjustable member supported from the body top and having the upper end thereof operatively engaging with the damper at a point forwardly of the horizontal axis and the lower end thereof extending into the vehicle body; and
(B) tensioned spring means engageable with the damper at a point forwardly of the horizontal axis to urge the forward end of the damper downwardly.

References Cited

UNITED STATES PATENTS

| | | | |
|---|---|---|---|
| 1,956,123 | 4/1934 | Givens | 98—2.7 |
| 1,958,056 | 5/1934 | Lintern | 98—2.7 |
| 1,969,935 | 8/1934 | Lintern | 98—2.7 |
| 2,987,980 | 6/1961 | Winn | 98—2.7 |

MEYER PERLIN, *Primary Examiner.*